US012110950B1

(12) United States Patent
Palfai et al.

(10) Patent No.: US 12,110,950 B1
(45) Date of Patent: Oct. 8, 2024

(54) COMPACT TWO-SPEED TRANSMISSION WITH COMPOUND PLANETARY STAGE

(71) Applicant: Atieva, Inc., Newark, CA (US)

(72) Inventors: Balazs Palfai, Newark, CA (US); Aravind Srinivasan, Fremont, CA (US); Sai Krishna Enabothula, Milpitas, CA (US); Bela Hegedus, Emeryville, CA (US); Jean-Philippe Gauthier, Oakland, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/526,947

(22) Filed: Dec. 1, 2023

(51) Int. Cl.
*F16H 3/66* (2006.01)
*B60K 1/02* (2006.01)
*B60K 17/08* (2006.01)

(52) U.S. Cl.
CPC ............ *F16H 3/666* (2013.01); *B60K 1/02* (2013.01); *B60K 17/08* (2013.01); *F16H 2200/0034* (2013.01); *F16H 2200/2007* (2013.01)

(58) Field of Classification Search
CPC ........ F16H 2200/202–2028; F16H 2200/2069; F16H 2200/2071; F16H 2200/2035; F16H 2200/2005; F16H 3/66–3/666; F16H 2200/0034; F16H 2200/2066; F16H 2200/2038; F16H 41/00–41/36
See application file for complete search history.

(56) References Cited

U.S. PATENT DOCUMENTS

| | | | |
|---|---|---|---|
| 8,226,517 B2 | 7/2012 | Tsai et al. | |
| 9,109,666 B1 | 8/2015 | Gauthier | |
| 10,797,562 B2 | 10/2020 | Dlala et al. | |
| 2015/0158382 A1* | 6/2015 | Mordukhovich | F16H 3/46 475/318 |
| 2015/0330492 A1* | 11/2015 | Lee | B60K 1/00 475/331 |
| 2016/0341262 A1* | 11/2016 | Ramsey | F16D 41/063 |
| 2017/0059023 A1* | 3/2017 | Severinsson | B60K 17/165 |
| 2017/0175868 A1 | 6/2017 | Riera et al. | |
| 2020/0278011 A1* | 9/2020 | Torii | F16D 49/08 |
| 2023/0106800 A1 | 4/2023 | Hand et al. | |
| 2024/0068545 A1* | 2/2024 | Palfai | B60K 1/02 |

FOREIGN PATENT DOCUMENTS

KR 20120099684 A 9/2012
WO 2011060362 A1 5/2011

\* cited by examiner

*Primary Examiner* — Ernesto A Suarez
*Assistant Examiner* — Lillian T Nguyen
(74) *Attorney, Agent, or Firm* — Brake Hughes Bellermann LLP

(57) ABSTRACT

A transmission comprises: a first planetary stage including a first ring gear defining first internal teeth; a ground component defining second internal teeth; a compound planetary stage including a one-way clutch with an inner race and an outer race, the outer race having a first tapered surface; and an adaptor defining external teeth and a second tapered surface, the adaptor being movable into at least a first position where the first tapered surface and the second tapered surface are connected with each other, and into a second position where instead the first internal teeth are gear coupled with the second internal teeth.

20 Claims, 10 Drawing Sheets

COMPACT TWO-SPEED TRANSMISSION WITH COMPOUND PLANETARY STAGE

TECHNICAL FIELD

This document relates to a compact two-speed transmission with a compound planetary stage.

BACKGROUND

In some electric vehicles presently available, an electric motor may be designed to operate without a gearbox. As a result, such a motor operates with a fixed gear ratio at all times, which limits its performance and efficiency. Other electric vehicles use a gearbox that allows shifting between two gears. However, these gearboxes are complex mechanisms that take up significant space, they may have low efficiency and/or deliver low initial torque, and they place a significant inertia load on the drivetrain (e.g., an excessive jerk when shifting).

SUMMARY

In a first aspect, a transmission comprises: a first planetary stage including a first ring gear defining first internal teeth; a ground component defining second internal teeth; a compound planetary stage including a one-way clutch with an inner race and an outer race, the outer race having a first tapered surface; and an adaptor defining external teeth and a second tapered surface, the adaptor being movable into at least a first position where the first tapered surface and the second tapered surface are connected with each other, and into a second position where instead the first internal teeth are gear coupled with the second internal teeth.

Implementations can include any or all of the following features. The compound planetary stage has a common shaft with the first planetary stage. The adaptor is also movable into at least a third position where the first tapered surface and the second tapered surface are not connected with each other, and where the first internal teeth are not gear coupled with the second internal teeth. The first position corresponds to a first gear ratio for the transmission, and wherein the second position corresponds to a second gear ratio for the transmission. The first gear ratio is greater than the second gear ratio. The first planetary stage further comprises: a sun gear to be rotated about an axis by a rotor shaft; and a first planetary gear that is gear coupled to the sun gear. The first planetary stage comprises multiple first planetary gears that are gear coupled to the sun gear. The compound planetary stage further comprises: a second planetary gear; a second ring gear that is gear coupled to the second planetary gear; and a carrier member carrying the first and second planetary gears. The first planetary gear has a first diameter, wherein the second planetary gear has a second diameter, and wherein the first diameter is greater than the second diameter. The carrier member is coaxial with the sun gear. The inner race of the one-way clutch is coupled to the second ring gear. The compound planetary stage comprises multiple second planetary gears that are gear coupled to the second ring gear. The second planetary gear has a common shaft with the first planetary gear. The transmission further comprises another one-way clutch coupled between the first ring gear and ground in the transmission.

In a second aspect, a transmission comprises: a first planetary stage including a first ring gear; a ground component; a compound planetary stage including a second ring gear; and means for selectively i) connecting the second ring gear to the ground component, wherein the transmission has a first gear ratio, and ii) instead connecting the first ring gear to the ground component, wherein the transmission has a second gear ratio.

In a third aspect, a vehicle comprises: a first electric motor having a first rotor shaft; and a first transmission coupled to the first rotor shaft of the first electric motor, the first transmission comprising: a first planetary stage including a first ring gear defining first internal teeth; a ground component defining second internal teeth; a compound planetary stage including a one-way clutch with an inner race and an outer race, the outer race having a first tapered surface; and an adaptor defining external teeth and a second tapered surface, the adaptor being movable into at least a first position where the first tapered surface and the second tapered surface are connected with each other, and into a second position where instead the first internal teeth are gear coupled with the second internal teeth.

Implementations can include any or all of the following features. In the first position of the adaptor the first transmission has a first gear ratio, wherein in the first gear ratio the first transmission: does not provide regenerative braking; and provides a reverse gear mode by reversing a rotation direction of the first rotor shaft; and in the second position of the adaptor the first transmission has a second gear ratio, and wherein in the second gear ratio the first transmission: does provide the regenerative braking; and does not provide the reverse gear mode. The vehicle further comprises: a second electric motor having a second rotor shaft; and a second transmission coupled to the second rotor shaft of the second electric motor; wherein: in the first gear ratio of the first transmission the vehicle uses the second transmission for regenerative braking using; and in the second gear ratio of the first transmission the vehicle uses the second transmission for the reverse gear mode.

In a fourth aspect, a transmission comprises: a first planetary stage comprising: a sun gear to be rotated about an axis by a rotor shaft; a first planetary gear that is gear coupled to the sun gear; and a first ring gear defining first internal teeth, the first ring gear being gear coupled to the first planetary gear by the first internal teeth; a ground component defining second internal teeth; a compound planetary stage comprising: a second planetary gear having a common shaft with the first planetary gear; a second ring gear that is gear coupled to the second planetary gear; a carrier member carrying the first and second planetary gears, the carrier member coaxial with the sun gear; and a one-way clutch having an inner race that is coupled to the second ring gear, and an outer race having a first tapered surface being tapered along the axis; and an adaptor defining i) external teeth being gear coupled to the second internal teeth, and ii) a second tapered surface being tapered along the axis, the adaptor being movable into at least: a first position where the first tapered surface and the second tapered surface are connected with each other, and where the first internal teeth are not gear coupled with the second internal teeth; and a second position where the first tapered surface and the second tapered surface are not connected with each other, and where the first internal teeth are gear coupled with the second internal teeth.

Implementations can include the following feature. The transmission further comprises another one-way clutch coupled between the first ring gear and ground in the transmission.

DETAILED DESCRIPTION

This document describes examples of systems and techniques relating to a compact two-speed transmission with a compound planetary stage. With this architecture, a two-speed transmission can provide smooth shifting for vehicles with electric motors and be implemented within a reduced packaging space. Such a two-speed transmission can generate a high initial torque and also operate at high efficiency zones of the motor at all speeds.

Examples herein refer to a vehicle. A vehicle is a machine that transports passengers or cargo, or both. A vehicle can have one or more electric motors. Examples of vehicles include, but are not limited to, cars, trucks, buses, motorcycles, and scooters. The number of wheels can differ between types of vehicles, and one or more (e.g., all) of the wheels can be used for propulsion of the vehicle. The vehicle can include a passenger compartment accommodating one or more persons. A vehicle can be powered exclusively by electricity, or can use one or more other energy sources in addition to electricity, to name just a few examples.

Examples described herein refer to an electric motor. As used herein, an electric motor includes any type of electric motor, including, but not limited to, a permanent-magnet motor, an induction motor, a synchronous motor, or a reluctance motor.

Examples described herein refer to a ground component that is part of a transmission. As used herein, a ground component is a component not subject to rotation or translation relative to the rest of the transmission during operation. Examples of ground components include, but are not limited to, a housing or case of the transmission.

Examples described herein refer to a one-way clutch. As used herein, a one-way clutch is a mechanical component that limits relative rotation between two components to single-direction rotation. Examples of one-way clutches include, but are not limited to, one-way roller clutches and one-way sprag clutches.

Examples described herein refer to two gears being on a common shaft. As used herein, two gears being on a common shaft signifies that the two gears cannot rotate independently of each other; rather, at any moment the two gears either both rotate with the same angular frequency, or both do not rotate. Examples of two gears being on a common shaft include, but are not limited to, the gears being welded together or being cut on the same blank.

Examples described herein refer to a component having external teeth or internal teeth. As used herein, external teeth face radially outward from a rotation axis of the component.

As used herein, internal teeth face radially inward from a rotation axis of the component.

Examples described herein refer to two or more components being connected with each other. As used herein, being connected signifies that the components touch each other, wherein if at least one of the components is currently being held stationary, the other also does not move.

Figure 1B:
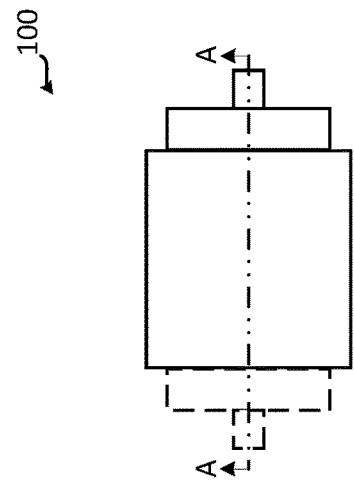
FIGS. 1A-1C show an example of an electric motor with a transmission according to the present subject matter.
Figure 1C:
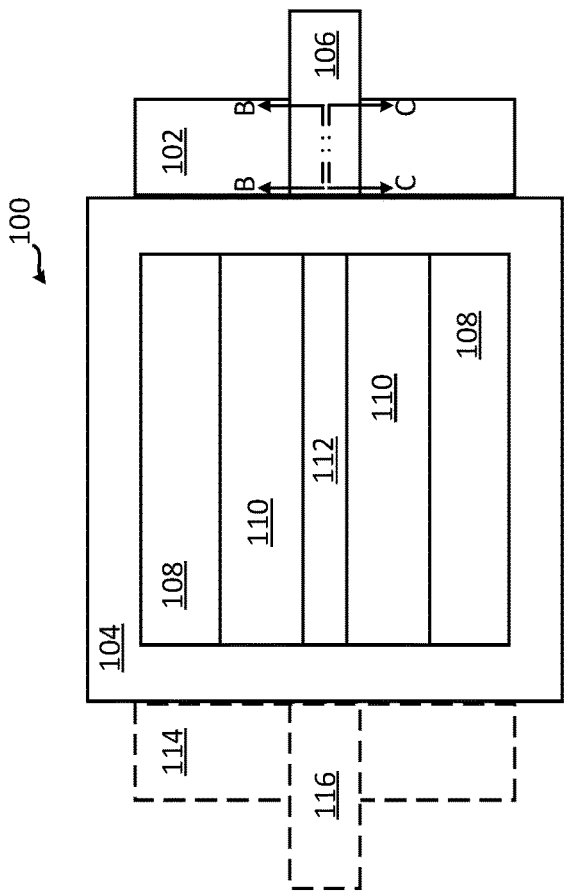
Figure 1A:
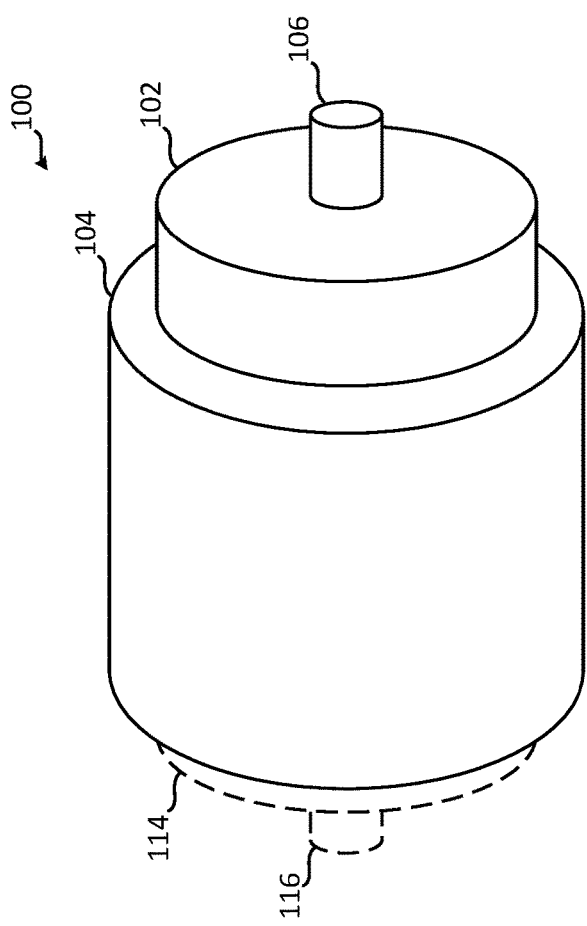

FIGS. 1A-1C show an example of an electric motor 100 with a transmission 102 according to the present subject matter. FIG. 1A shows a perspective view, FIG. 1B a side view, and FIG. 1C a cross section taken along the line A-A in FIG. 1B, of the electric motor 100. Here, the transmission 102 is mounted at one end of a motor housing 104. The electric motor 100 and/or the transmission 102 can be used with one or more other examples described elsewhere herein. The electric motor 100 can have a single-side transmission or can have an active-core style dual planetary transmission, to name just two examples.

The transmission 102 has an output shaft 106. For example, the output shaft 106 can be coupled to a wheel axle (e.g., welded to a drive shaft) or any other load to be driven by the electric motor 100. The electric motor 100 has a stator 108 and a rotor 110 within the motor housing 104. The rotor 110 is coupled to a rotor shaft 112 so as to be rotatable. For example, the electric motor 100 can rotate the rotor shaft 112 in one direction to drive the vehicle forward using any of multiple gears of the transmission 102. As another example, in at least one of the gears of the transmission 102, the rotor shaft 112 can instead be rotated in the opposite direction to drive the vehicle in reverse. As another example, in at least one of the gears of the transmission 102, regenerative braking can be performed to convert torque from a rotating road wheel into electric energy. In some implementations, the electric motor 100 has a transmission 114 mounted at the opposite end of the motor housing 104 from the transmission 102. The transmission 114 has an output shaft 116 and can be similar or identical to the transmission 102.

Figure 2A:
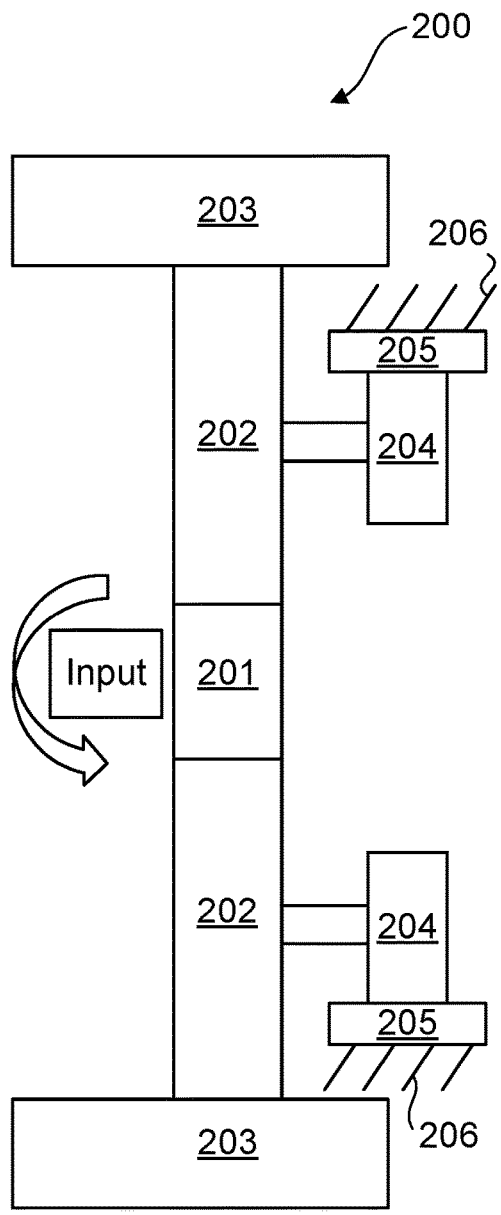
FIGS. 2A-2B schematically show examples of a transmission according to the present subject matter.
Figure 2B:
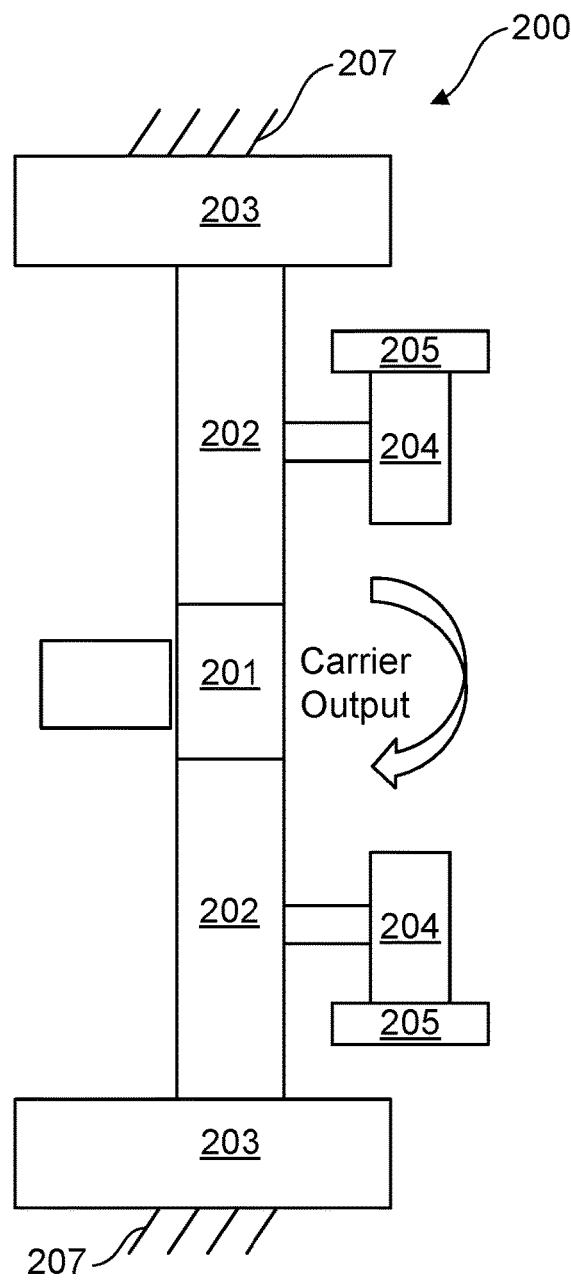

FIGS. 2A-2B schematically show examples of a transmission 200 according to the present subject matter. The transmission 200 is schematically represented using rectangular shapes. While FIGS. 2A-2B are schematical illustrations and not pure sections, the perspectives presented in them approximately represent the view of a section taken along the line B-B in FIG. 1C, in an implementation where the transmission 102 includes the components of the transmission 200. The transmission 200 can be used with one or more other examples described elsewhere herein.

The transmission 200 includes a sun gear 201 that is driven by a component labeled "Input". In some implementations, the sun gear 201 can be coupled to a rotor shaft of an electric motor with which the transmission 200 is being used (e.g., the rotor shaft 112 in FIGS. 1A-1C). The transmission 200 includes one or more planetary gears 202 that are gear coupled to the sun gear 201. Each of the planetary gears 202 can rotate about an axis. Each of the planetary gears 202 can also rotate about the axis of the sun gear 201, for example using a carrier. The transmission 200 includes a ring gear 203 that is gear coupled to the planetary gear(s) 202. The sun gear 201, the planetary gear(s) 202 and the ring gear 203 can collectively be referred to as a first planetary stage of the transmission 200.

The transmission 200 includes one or more planetary gears 204 having a common shaft (sometimes referred to as a common pin) with the corresponding planetary gear(s) 202. The planetary gear 202 has a first diameter, and the planetary gear 204 has a second diameter, the first diameter being greater than the second diameter. The transmission 200 includes a ring gear 205 that is gear coupled to the planetary gear(s) 204. The planetary gear(s) 204 and the ring gear 205 can collectively be referred to as a compound planetary stage of the transmission 200.

FIG. 2A shows an example of a first mode of operation of the transmission 200. The first mode corresponds to a first gear ratio for the transmission 200. For example, the first gear ratio can be referred to as a first gear for the vehicle. In the first mode of operation, the ring gear 205 is held stationary, which is here schematically illustrated by the ring gear 205 being connected to a ground 206. For example, a one-way clutch coupled to the ring gear 205 can be selectively coupled through a spline adaptor to the ground 206. By contrast, the ring gear 203 is not held stationary in the first mode of operation.

FIG. 2B shows an example of a second mode of operation of the transmission 200. The second mode corresponds to a second gear ratio for the transmission 200. For example, the second gear ratio can be referred to as a second gear for the vehicle. The first gear ratio (of FIG. 2A) can be greater than the second gear ratio. In the second mode of operation, the ring gear 203 is held stationary, which is here schematically illustrated by the ring gear 203 being connected to a ground 207. For example, a spline adaptor can selectively couple the ring gear 203 to the ground 207. By contrast, the ring gear 205 is not held stationary in the second mode of operation.

The rotor shaft of the electric motor can rotate in either of two directions. In FIG. 2A, an arrow at the input for the sun gear 201 schematically illustrates a rotation direction. The input rotation direction can be a clockwise, or counterclockwise, rotation when viewed from the electric motor toward the transmission 200. In FIG. 2B, an arrow at the carrier of the planetary gears 204 schematically illustrates the same rotation direction as that of the input. As such, the carrier output rotation can be a clockwise, or counterclockwise, rotation when viewed from the electric motor toward the transmission 200. The two different gear ratios of the transmission 200 facilitate that the electric motor can always be run in high-efficiency regions. For example, the larger reduction ratio is used at lower revolutions per minute (rpm) for increased initial torque. As another example, the lower reduction ratio is used at higher rpm for higher top speed.

Figure 3A:
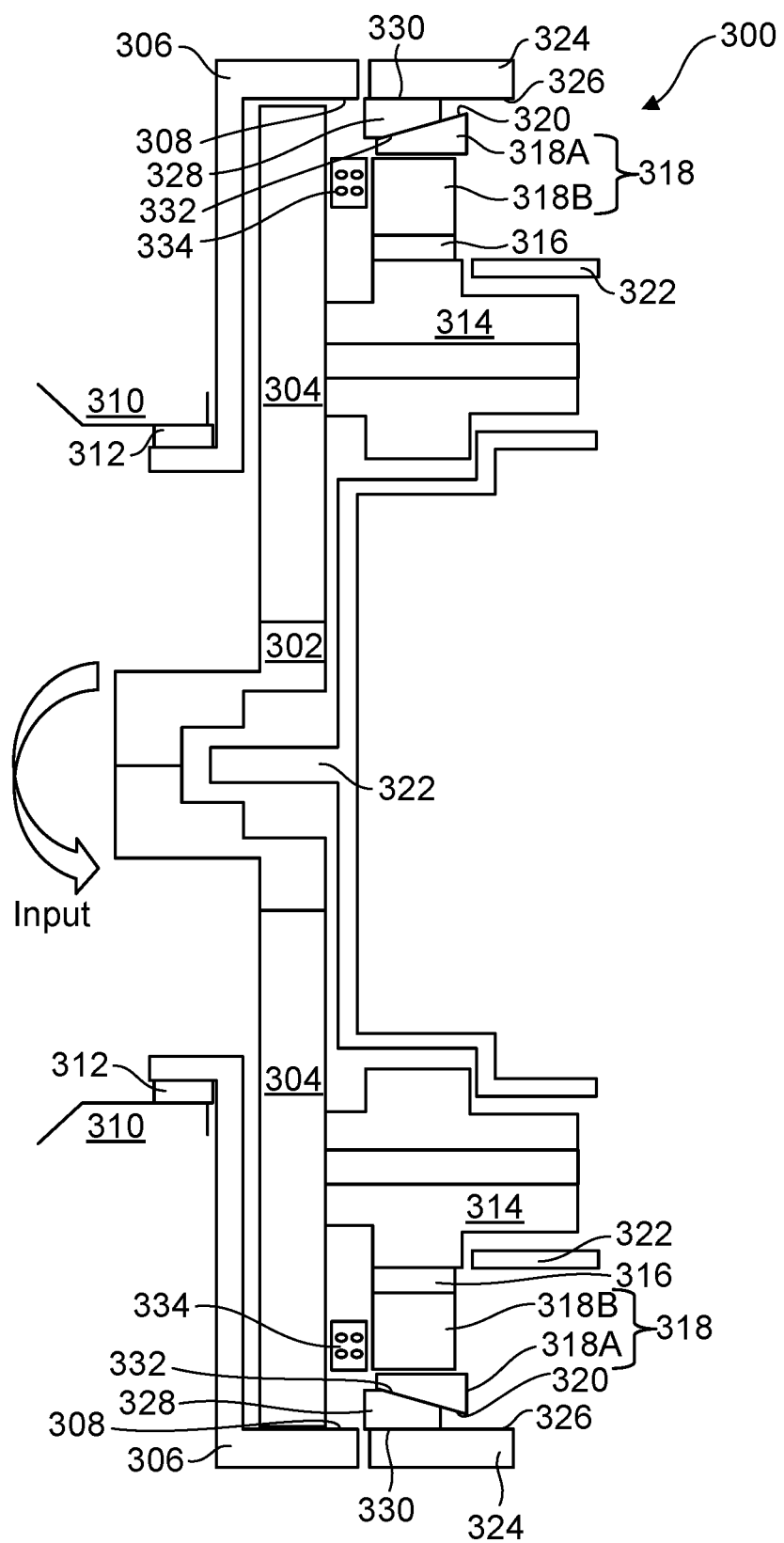
FIGS. 3A-3B schematically show additional examples of a transmission according to the present subject matter.
Figure 3B:
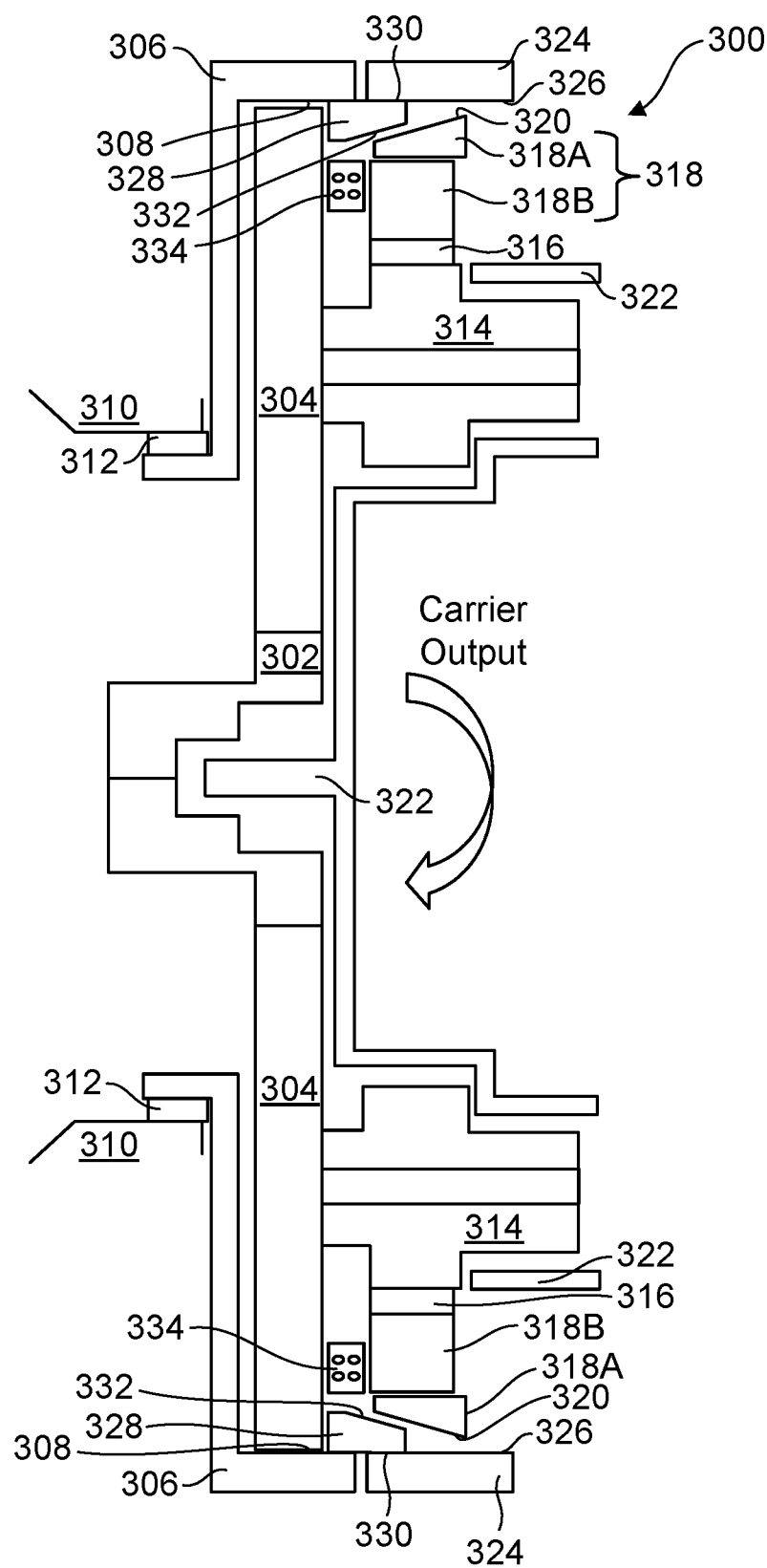

FIGS. 3A-3B schematically show additional examples of a transmission 300 according to the present subject matter. The transmission 300 is schematically represented using rectangular shapes. While FIGS. 3A-3B are schematical illustrations and not pure sections, the perspectives presented in them approximately represent the view of a section taken along the line B-B in FIG. 1C, in an implementation where the transmission 102 includes the components of the transmission 300. The transmission 300 can be used with one or more other examples described elsewhere herein.

The transmission 300 includes a sun gear 302 that is driven by a component represented by the label "Input". In some implementations, the sun gear 302 can be coupled to a rotor shaft of an electric motor with which the transmission 300 is being used (e.g., the rotor shaft 112 in FIGS. 1A-1C). The transmission 300 includes one or more planetary gears 304 that are gear coupled to the sun gear 302. Each of the planetary gears 304 can rotate about an axis. Each of the planetary gears 304 can also rotate about the axis of the sun gear 302 using a carrier, for example as described below. The transmission 300 includes a ring gear 306 that is gear coupled to the planetary gear(s) 304. The ring gear 306 defines internal teeth 308 that extend parallel with the axis of the sun gear 302. The ring gear 306 can be coupled to a ground component 310 by a one-way clutch 312. The one-way clutch 312 can help with mechanically synchronizing the ring gear 306 to zero speed to provide smooth shifting between gears (e.g., as described below). The sun gear 302, the planetary gear(s) 304 and the ring gear 306 can collectively be referred to as a first planetary stage of the transmission 300.

The transmission 300 includes one or more planetary gears 314 having a common shaft (sometimes referred to as a common pin) with the corresponding planetary gear(s) 304. The planetary gear 304 has a first diameter, and the planetary gear 314 has a second diameter, the first diameter being greater than the second diameter. The transmission 300 includes a ring gear 316 that is coaxial with the sun gear 302 and gear coupled to the planetary gear(s) 314. The transmission 300 includes a one-way clutch 318. The one-way clutch 318 is positioned radially outward of the ring gear 316. The one-way clutch 318 has an outer race 318A with a tapered surface 320. The tapered surface 320 is tapered along the rotation axis of the sun gear 302. The one-way clutch 318 has an inner race 318B. The inner race 318B is connected to the ring gear 316. Between the outer and inner races 318A-318B, the one-way clutch 318 includes sprags, or rollers biased by springs toward wedging planes, so as to provide single-direction rotation between the outer and inner races 318A-318B. The transmission 300 includes a carrier member 322 carrying the planetary gears 304 and 314, the carrier member 322 being coaxial with the sun gear 302. The carrier member 322 can define a bearing nest for at least the planetary gear(s) 314. For example, in this sectional view a portion of the carrier member 322 is visible radially outward of the shaft of the planetary gears 304 and 314. The planetary gear(s) 314, the ring gear 316 and the one-way clutch 318 can collectively be referred to as a compound planetary stage of the transmission 300.

The transmission 300 includes a ground component 324 that can be used for selectively holding either the ring gear 306 or the ring gear 316 stationary. The ground component 324 can be part of the same structure as the ground component 310 (e.g., a case or housing of the transmission 300). The ground component 324 defines internal teeth 326 that extend parallel with the axis of the sun gear 302.

The transmission 300 includes an adaptor 328 that can be translated along the axis of the sun gear 302. The adaptor 328 defines external teeth 330. The external teeth 330 mesh with the internal teeth 326 of the ground component 324. The adaptor 328 defines a tapered surface 332. The tapered surface 332 is tapered along the rotation axis of the sun gear 302 so as to face the tapered surface 320.

The transmission 300 includes a solenoid 334 that is fixed (coupled to ground, not shown) and can directly or indirectly actuate the adaptor 328 to move in either or both directions.

FIG. 3A shows an example of a first mode of operation of the transmission 300. The first mode corresponds to a first gear ratio for the transmission 300. For example, the first gear ratio can be referred to as a first gear for the vehicle. In the first mode of operation, the ring gear 316 is held stationary, whereas the ring gear 306, by contrast, is not held stationary. In the first mode of operation, the adaptor 328 is moved toward the right in the present illustration into a first position where the tapered surfaces 320 and 332 are connected with each other, and where the external teeth 330 of the adaptor 328 do not mesh with the internal teeth 308 of the ring gear 306. For example, the solenoid 334 is energized to actuate the adaptor 328 into the first position. As another example, the solenoid 334 is deenergized so that a bias member acting on the adaptor 328 advances the adaptor 328 into the first position. The external teeth 330 of the adaptor 328 can mesh with the internal teeth 326 of the ground component 324 in the first position of the adaptor 328 and also in other positions. That is, the ring gear 316 is held stationary in the first mode of operation by the ground component 324 through the one-way clutch 318 and the adaptor 328.

FIG. 3B shows an example of a second mode of operation of the transmission 300. The second mode corresponds to a second gear ratio for the transmission 300. For example, the second gear ratio can be referred to as a second gear for the vehicle. The first gear ratio (of FIG. 3A) can be greater than the second gear ratio. In the second mode of operation, the ring gear 306 is held stationary, whereas the ring gear 316, by contrast, is not held stationary. In the second mode of operation, the adaptor 328 is moved toward the left in the present illustration into a second position where the tapered surfaces 320 and 332 are not connected with each other, and where the external teeth 330 of the adaptor 328 mesh with the internal teeth 308 of the ring gear 306. For example, the solenoid 334 is energized to actuate the adaptor 328 into the second position. As another example, the solenoid 334 is deenergized so that a bias member acting on the adaptor 328 advances the adaptor 328 into the second position. The external teeth 330 of the adaptor 328 can mesh with the internal teeth of the ground component 324 in the second position of the adaptor 328 and also in other positions. That is, the ring gear 306 is held stationary in the second mode of operation by the ground component 324 through the adaptor 328.

Between the first mode (FIG. 3A) and the second mode (FIG. 3B) the transmission 300 can have a third mode of operation. The third mode of operation can temporarily occur while the transmission 300 is shifting from the first gear to the second gear, and also while the transmission 300 is shifting from the second gear to the first gear. In the third mode, neither of the ring gear 306 or the ring gear 316 is held stationary. As such, both the ring gear 306 and the ring gear 316 can be free to rotate in the third mode.

The described examples illustrate that a transmission (e.g., the transmission 300) can include: a first planetary stage including a first ring gear (e.g., the ring gear 306) defining first internal teeth (e.g., the internal teeth 308); a ground component (e.g., the ground component 324) defining second internal teeth (e.g., the internal teeth 326); a compound planetary stage including a one-way clutch (e.g., the one-way clutch 318) with an inner race (e.g., the inner race 318B) and an outer race (e.g., the outer race 318A), the outer race having a first tapered surface (e.g., the tapered surface 320); and an adaptor (e.g., the adaptor 328) defining external teeth (e.g., the external teeth 330) and a second tapered surface (e.g., the tapered surface 332), the adaptor being movable into at least a first position (e.g., as shown in FIG. 3A) where the first tapered surface and the second tapered surface are connected with each other, and into a second position (e.g., as shown in FIG. 3A) where instead the first internal teeth are gear coupled with the second internal teeth.

Figure 4:
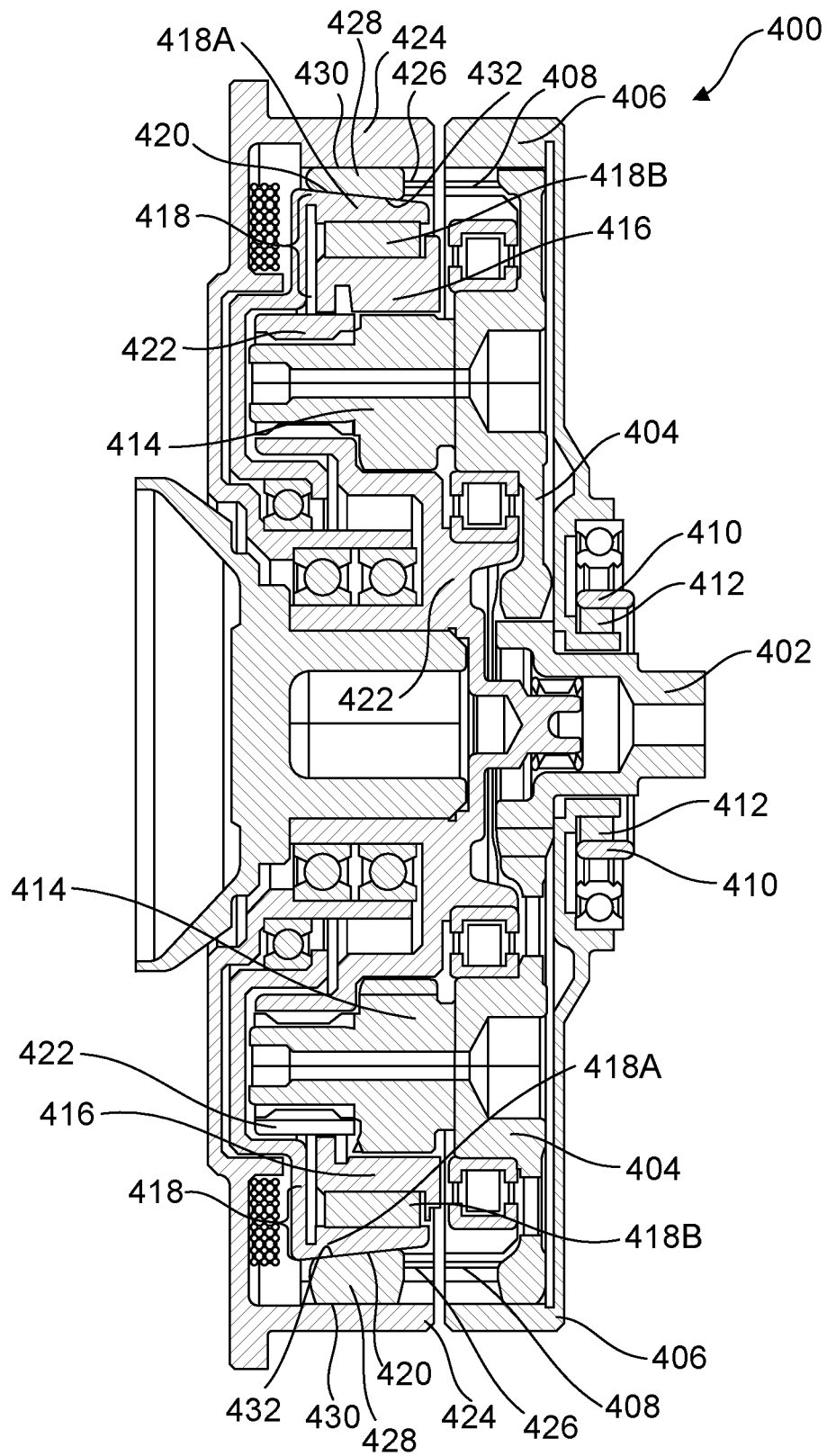
FIG. 4 shows a cross section of an example of a transmission according to the present subject matter.

FIG. 4 shows a cross section of an example of a transmission 400 according to the present subject matter. The cross section is taken along the line C-C in FIG. 1C, in an implementation where the transmission 102 includes the components of the transmission 400. The transmission 400 can be used with one or more other examples described elsewhere herein.

The transmission 400 includes a sun gear 402 that is driven by a component such as the rotor shaft of an electric motor (e.g., the rotor shaft 112 in FIGS. 1A-1C). The transmission 400 includes one or more planetary gears 404 that are gear coupled to the sun gear 402. Each of the planetary gears 404 can rotate about an axis. Each of the planetary gears 404 can also rotate about the axis of the sun gear 402 using a carrier, for example as described below. The transmission 400 includes a ring gear 406 that is gear coupled to the planetary gear(s) 404. The ring gear 406 defines internal teeth 408 that that extend parallel with the axis of the sun gear 402. The ring gear 406 can be coupled to a ground component 410 by a one-way clutch 412. The sun gear 402, the planetary gear(s) 404 and the ring gear 406 can collectively be referred to as a first planetary stage of the transmission 400.

The transmission 400 includes one or more planetary gears 414 having a common shaft (sometimes referred to as a common pin) with the corresponding planetary gear(s) 404. The planetary gear 404 has a first diameter, and the planetary gear 414 has a second diameter, the first diameter being greater than the second diameter. The transmission 400 includes a ring gear 416 that is coaxial with the sun gear 402 and gear coupled to the planetary gear(s) 414. The transmission 400 includes a one-way clutch 418. The one-way clutch 418 is positioned radially outward of the ring gear 416. The one-way clutch 418 has an outer race 418A with a tapered surface 420. The tapered surface 420 is tapered along the rotation axis of the sun gear 402. The one-way clutch 418 has an inner race 418B. The inner race 418B is connected to the ring gear 416. Between the outer and inner races 418A-418B, the one-way clutch 418 includes sprags, or rollers biased by springs toward wedging planes, so as to provide single-direction rotation between the outer and inner races 418A-418B. The transmission 400 includes a carrier member 422 carrying the planetary gears 404 and 414, the carrier member 422 being coaxial with the sun gear 402. The carrier member 422 can define a bearing nest for at least the planetary gear(s) 414. For example, in this sectional view a portion of the carrier member 422 is visible radially outward of the shaft of the planetary gears 404 and 414. The planetary gear(s) 414, the ring gear 416 and the one-way clutch 418 can collectively be referred to as a compound planetary stage of the transmission 400.

The transmission 400 includes a ground component 424 that can be used for selectively holding either the ring gear 406 or the ring gear 416 stationary. The ground component 424 can be part of the same structure as the ground component 410 (e.g., a case or housing of the transmission 400). The ground component 424 defines internal teeth 426 that extend parallel with the axis of the sun gear 402.

The transmission 400 includes an adaptor 428 that can be translated along the axis of the sun gear 402. The adaptor 428 defines external teeth 430. The external teeth 430 mesh with the internal teeth 426 of the ground component 424. The adaptor 428 defines a tapered surface 432. The tapered surface 432 is tapered along the rotation axis of the sun gear 402 so as to face the tapered surface 420.

FIG. 4 shows an example of a first mode of operation of the transmission 400. The first mode corresponds to a first gear ratio for the transmission 400. For example, the first gear ratio can be referred to as a first gear for the vehicle. In the first mode of operation, the ring gear 416 is held stationary, whereas the ring gear 406, by contrast, is not held stationary. In the first mode of operation, the adaptor 428 is moved toward the left in the present illustration into a first position where the tapered surfaces 420 and 432 are connected with each other, and where the external teeth 430 of the adaptor 428 do not mesh with the internal teeth 408 of the ring gear 406. For example, a solenoid is energized to actuate the adaptor 428 into the first position. As another example, the solenoid is deenergized so that a bias member acting on the adaptor 428 advances the adaptor 428 into the first position. The external teeth 430 of the adaptor 428 can mesh with the internal teeth 426 of the ground component 424 in the first position of the adaptor 428 and also in other positions. That is, the ring gear 416 is held stationary in the first mode of operation by the ground component 424 through the one-way clutch 418 and the adaptor 428.

A second mode of operation of the transmission 400 can correspond to a second gear ratio (e.g., a lower gear ratio), in which the ring gear 406 is held stationary, the ring gear 416 is not held stationary, and in which the adaptor 428 is moved toward the right in the present illustration into a second position where the tapered surfaces 420 and 432 are not connected with each other, and where the external teeth 430 of the adaptor 428 mesh with the internal teeth 408 of the ring gear 406. That is, the ring gear 406 is held stationary in the second mode of operation by the ground component 424 through the adaptor 428.

Between the first mode (FIG. 4) and the second mode (described above) the transmission 400 can have a third mode of operation. The third mode of operation can temporarily occur while the transmission 400 is shifting from the first gear to the second gear, and also while the transmission 400 is shifting from the second gear to the first gear. In the third mode, neither of the ring gear 406 or the ring gear 416 is held stationary. As such, both the ring gear 406 and the ring gear 416 can be free to rotate in the third mode.

Figure 5A:
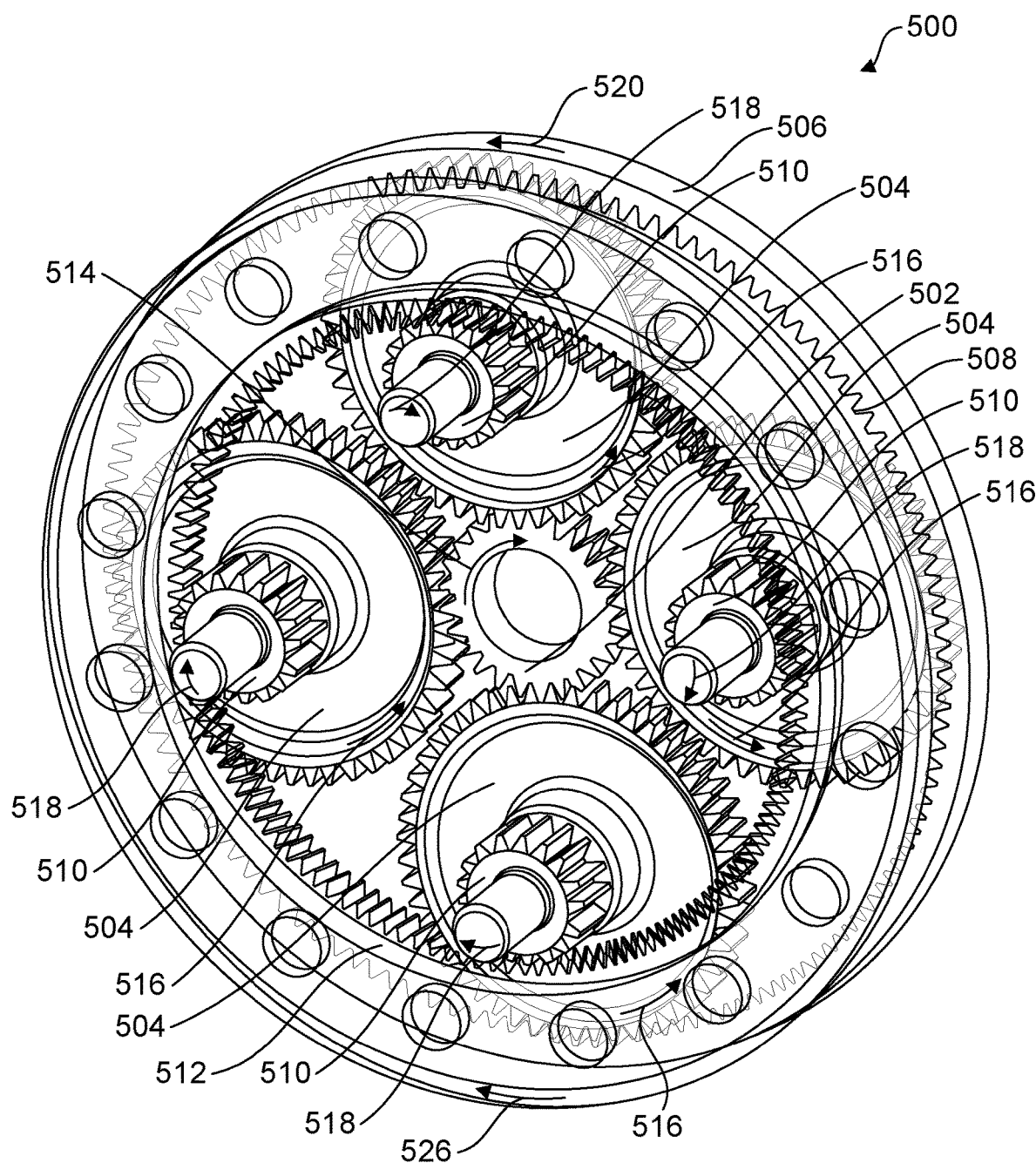
FIGS. 5A-5C show examples of a transmission according to the present subject matter.
Figure 5B:
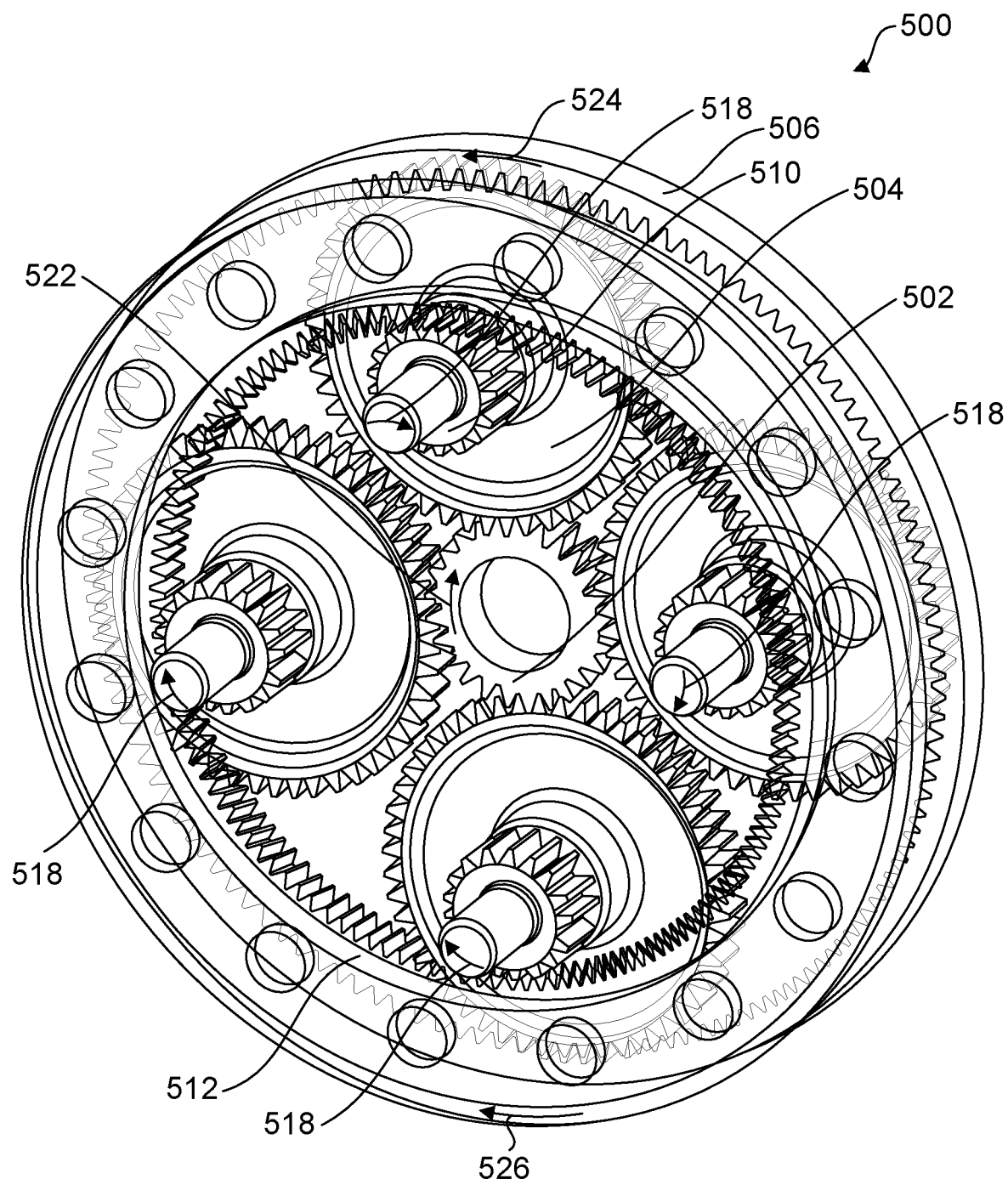
Figure 5C:
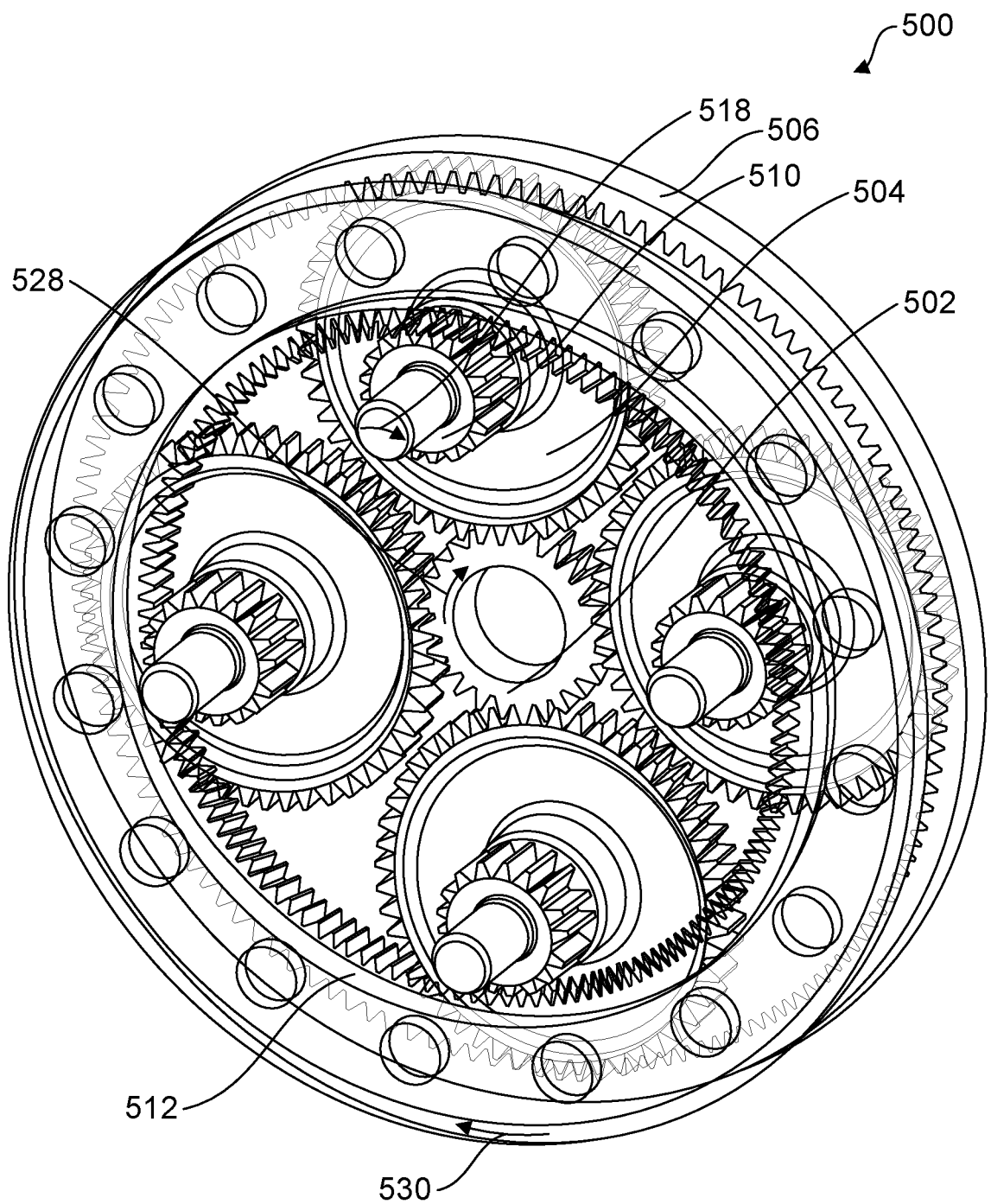

FIGS. 5A-5C show examples of a transmission 500 according to the present subject matter. The transmission 500 can be used with one or more other examples described elsewhere herein. The transmission 500 is here shown partially transparent to present its various components. The transmission 500 includes a sun gear 502 that is driven by a component such as the rotor shaft of an electric motor (e.g., the rotor shaft 112 in FIGS. 1A-1C). The transmission 500 here includes four planetary gears 504 that are gear coupled to the sun gear 502. Each of the planetary gears 504 can rotate about an axis. Each of the planetary gears 504 can also rotate about the axis of the sun gear 502 using a carrier (e.g., the carrier member 322 in FIGS. 3A-3B). The transmission 500 includes a ring gear 506 that is gear coupled to the planetary gears 504. The ring gear 506 defines internal teeth 508; the cusp of each of the internal teeth 508 defines a ridge that extends parallel with the axis of the sun gear 502. Each of the planetary gears 504 is gear coupled to only the sun gear 502 and the ring gear 506. The ring gear 506 can be coupled to a ground component (e.g., the ground component 310 in FIGS. 3A-3B) by a one-way clutch (e.g., the one-way clutch 312 in FIGS. 3A-3B). The sun gear 502, the planetary gear(s) 504 and the ring gear 506 can collectively be referred to as a first planetary stage of the transmission 500. As such, the first planetary stage can include multiple planetary gears.

The transmission 500 here includes four planetary gears 510 each having a common shaft (sometimes referred to as a common pin) with a corresponding one of the planetary gear(s) 504. The planetary gears 504 have a first diameter, and the planetary gears 510 have a second diameter, the first diameter being greater than the second diameter. The transmission 500 includes a ring gear 512 that is coaxial with the sun gear 502 and gear coupled to the planetary gears 510. Each of the planetary gears 510 is gear coupled to only the ring gear 512. The planetary gear(s) 510 and the ring gear 512 can collectively be referred to as a compound planetary stage of the transmission 500. As such, the compound planetary stage can include multiple planetary gears.

The transmission 500 can selectively hold either the ring gear 506 or the ring gear 512 stationary. In some implementations, an adaptor (e.g., the adaptor 328 in FIGS. 3A-3B, or the adaptor 428 in FIG. 4) can be used to either couple the ring gear 506, or the ring gear 512, to a ground component (e.g., the ground component 324 in FIGS. 3A-3B, or the ground component 424 in FIG. 4). In such examples, the ground component can be positioned radially outward of the ring gear 512, and the adaptor can be positioned radially inward of the ground component. For example, the adaptor can be actuated directly or indirectly by a solenoid.

FIG. 5A shows an example of a first mode of operation of the transmission 500. The first mode corresponds to a first gear ratio for the transmission 500. For example, the first gear ratio can be referred to as a first gear for the vehicle. In the first mode of operation, the ring gear 512 is held stationary, whereas the ring gear 506, by contrast, is not held stationary. The sun gear 502 can be driven to rotate in either direction. Here, a rotation 514 of the ring gear 506 is shown as an example. The rotation 514 causes each of the planetary gears 504 and 510 to undergo a rotation 516 about its respective common shaft. Also, the planetary carrier for the planetary gears 504 and 510 will undergo a rotation 518, as schematically indicated at each of the common shafts of the planetary gears 504 and 510. The planetary carrier can be the component that delivers motor torque from the transmission 500 to the traction wheel of the vehicle, and as such the rotational speed of the planetary carrier can indicate the rotational speed of the traction wheel. The ring gear 506, finally, will undergo a rotation 520 that is in the opposite direction of both the rotation 514 of the ring gear 506 and the rotation 518 of the carrier of the planetary gears 504 and 510.

FIG. 5B shows an example of an operation of the transmission 500 in shifting between gears. During this transition, the grounding of the ring gear 512 is removed so that both of the ring gears 506 and 512 are free to rotate. The sun gear 502 can undergo a rotation 522 that is slower than the rotation 514 in FIG. 5A. The planetary carrier for the planetary gears 504 and 510 can undergo the rotation 518, the same as in FIG. 5A. The ring gear 506 can undergo a rotation 524 that is in the same direction as, and slower than, the rotation 520 in FIG. 5A. The ring gear 512 can undergo a rotation 526 that is in the opposite direction of the rotations 520 and 524 of the ring gear 506.

FIG. 5C shows an example of a second mode of operation of the transmission 500. The second mode corresponds to a second gear ratio for the transmission 500. For example, the second gear ratio can be referred to as a second gear for the vehicle. In the second mode of operation, the ring gear 506 is held stationary and the ring gear 512 is not held stationary. The sun gear 502 can undergo a rotation 528 that is slower than the rotation 514 in FIG. 5A. The planetary carrier for the planetary gears 504 and 510 can undergo the rotation 518, the same as in FIGS. 5A-5B. The ring gear 512 can undergo a rotation 530 that is in the opposite direction of the rotations 520 and 524 of the ring gear 506 and that is faster than the rotation 526 in FIG. 5B.

Figure 6:
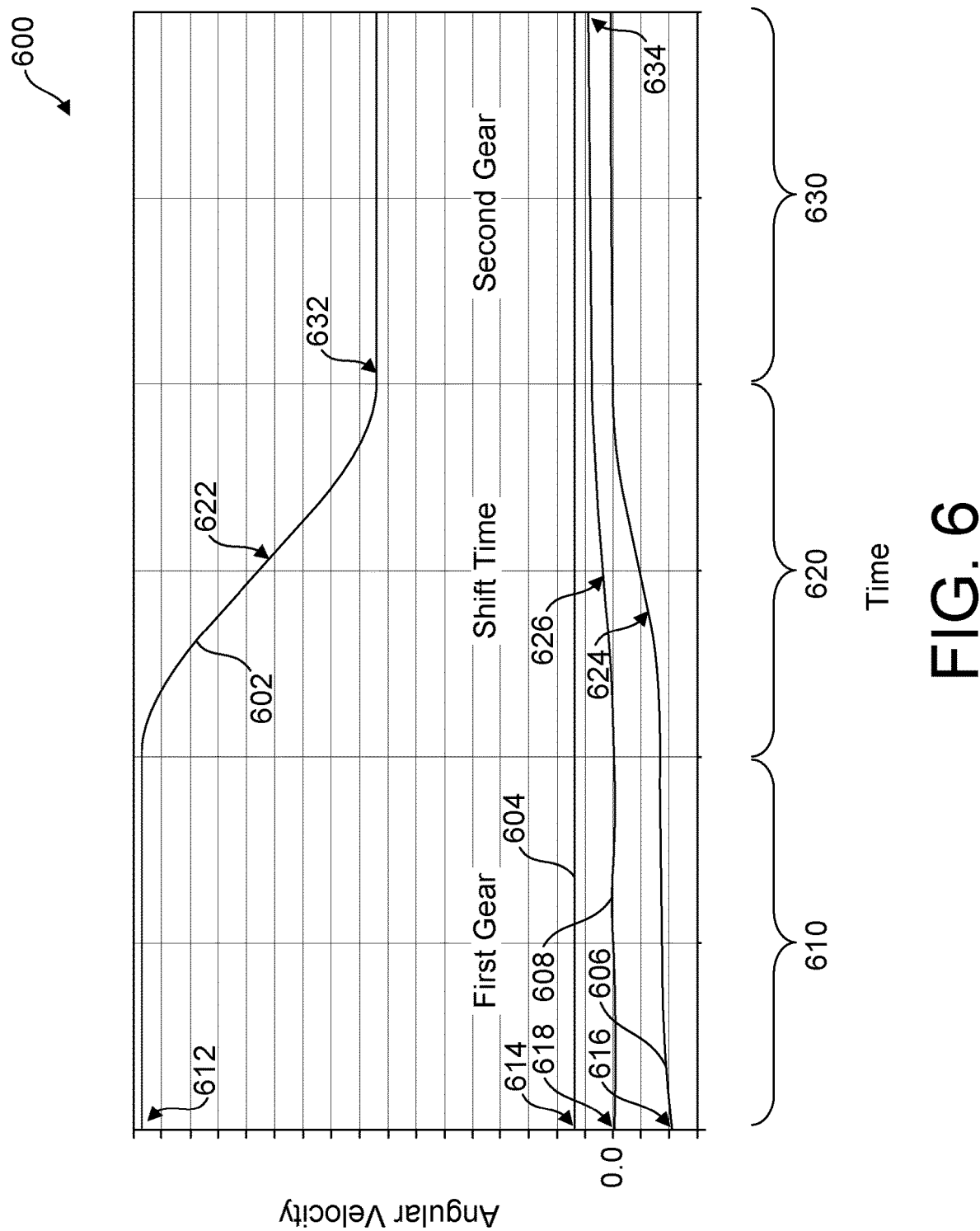
FIG. 6 shows a diagram with graphs exemplifying angular velocities for a rotor shaft speed, a planetary carrier speed, and ring gear speeds, respectively, of a transmission.

FIG. 6 shows a diagram 600 with graphs exemplifying angular velocities for a rotor shaft speed 602, a planetary carrier speed 604, and ring gear speeds 606 and 608, respectively, of a transmission. The diagram 600 shows angular velocity on a vertical axis as a function of time on a horizontal axis. The diagram 600 and/or any of its graphs can be used with one or more other examples described elsewhere herein.

A section 610 of the diagram 600 corresponds to operation using a first gear ratio (e.g., driving the vehicle in first gear). In the section 610, a ring gear of a compound planetary stage of the transmission is held stationary by being connected to ground. The rotor shaft can rotate with a speed 612 defined by motor control circuitry, for example based on accelerator pedal depression. The planetary carrier rotates with a speed 614 which can be reflective of the current rotation of the vehicle's road wheels. The ring gear having the ring gear speed 606 (e.g., a ring gear of a first planetary stage) rotates with a speed 616 that has the opposite rotation direction of the speed 612. A speed 618 of the ring gear having the ring gear speed 608 (e.g., a ring gear of a compound planetary stage) is zero.

A section 620 of the diagram 600 corresponds to a shift time in moving between the first gear ratio and a second gear ratio. In the section 620, both the ring gears (e.g., a ring gear of a compound planetary stage, and a ring gear of a first planetary stage) are free to rotate because neither of them is connected to ground. The rotor shaft can rotate with a speed 622 that is decreasing from the speed 612 in the section 610. The planetary carrier rotates with the same speed 614 as in the section 610 due to the load on the carrier. The ring gear having the ring gear speed 606 rotates with a speed 624 whose absolute value increases towards zero from the speed 616 in the section 610. For example, the one-way clutch 312 (FIGS. 3A-3B) can help mechanically synchronize the speed 624 of the ring gear having the ring gear speed 606 towards zero. The ring gear having the ring gear speed 608 rotates with a speed 626 that increases from the speed 618 in the section 610.

A section 630 of the diagram 600 corresponds to operation using a second gear ratio (e.g., driving the vehicle in second gear). In the section 630, a ring gear of a first planetary stage of the transmission is held stationary by being connected to ground. The rotor shaft can rotate with a speed 632 that is lower than the speed 612 in the section 610. The planetary carrier rotates with the same speed 614 as in the section 610 due to the load on the carrier. The ring gear having the ring gear speed 606 rotates with the speed 618 that is zero. The ring gear having the ring gear speed 608 rotates with a speed 634, the rotation being in the same direction as that of the rotor shaft.

Figure 7:
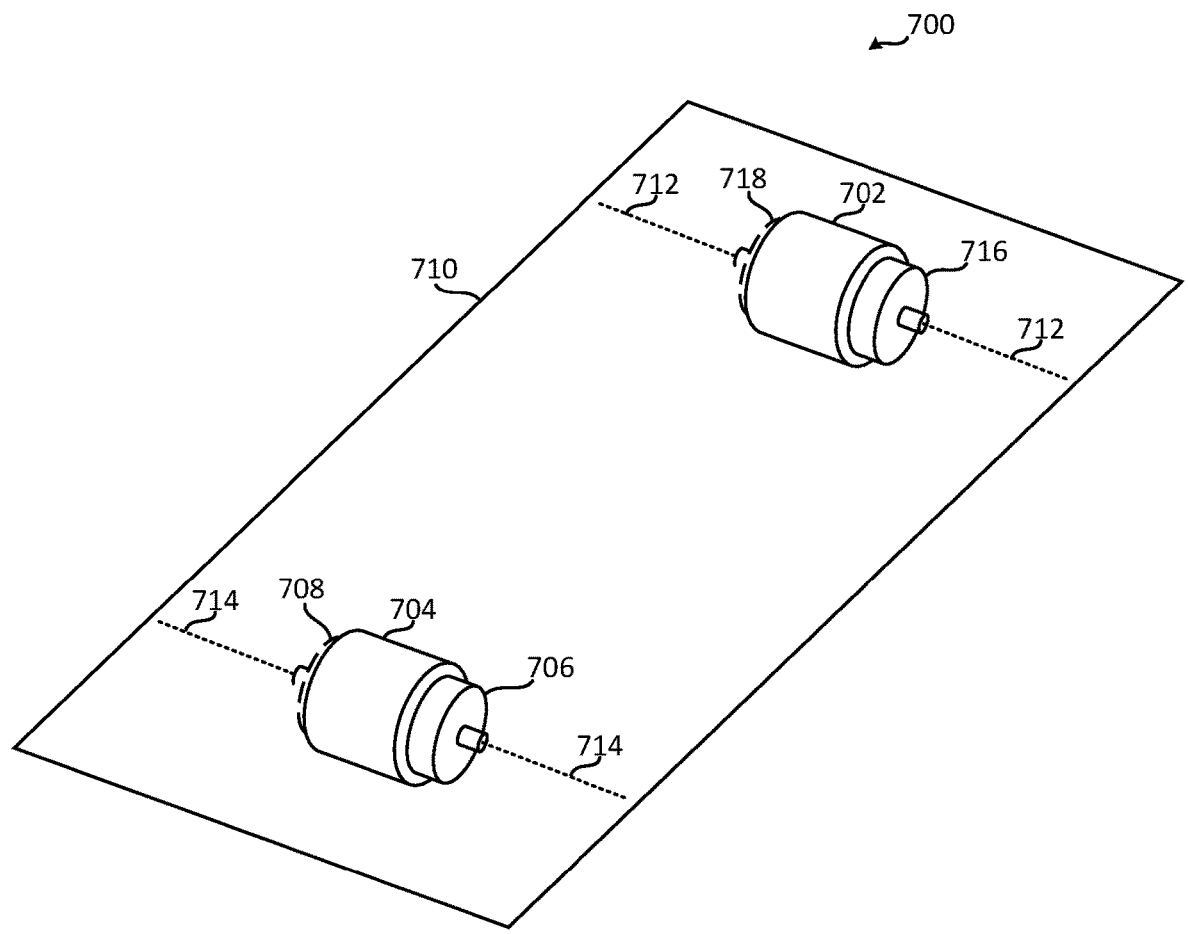
FIG. 7 schematically shows an example of a vehicle with at least two electric motors, at least one of which has a transmission according to the present subject matter. Like reference symbols in the various drawings indicate like elements.

Some examples of a vehicle with multiple electric motors will now be described. FIG. 7 schematically shows an example of a vehicle 700 with at least two electric motors 702 and 704, at least one of which has a transmission according to the present subject matter. Here, the electric motor 704 has a transmission 706 according to the present subject matter where one of the corresponding ring gears of respective planetary stages can be selectively grounded to effectuate different gear ratios. The electric motor 704 can also have a transmission 708 according to the present subject matter.

The vehicle 700 is schematically illustrated using a rectangle 710. For example, the rectangle 710 here represents the body, passenger cabin, chassis, wheels, energy storage (e.g., battery pack), electrical system, and thermal system of the vehicle 700. At least one aspect of the examples in FIG. 7 can be used with one or more other examples described elsewhere herein.

The electric motor 702 can be configured to work with an axle 712 of the vehicle 700. Similarly, the electric motor 704 can be configured to work with an axle 714 of the vehicle 700. Each of the axles 712 and 714 is here schematically illustrated as a dashed line and can be coupled to one or more respective road wheels (not shown) of the vehicle 700. In some implementations, the electric motor 702 can be referred to as a front motor, and the electric motor 704 as a rear motor, of the vehicle 700. In other implementations, the electric motor 704 can be referred to as a front motor, and the electric motor 702 as a rear motor, of the vehicle 700. The electric motor 702 can have only a transmission 716 or can also have a transmission 718.

To drive the vehicle 700 forward, either or both of the electric motors 702 or 704 can operate in a forward direction. For example, the transmission 706 can begin operating in first gear and subsequently be shifted into second gear. Similarly, the transmission 716 can begin operating in first gear and subsequently be shifted into second gear, which shifting may occur at the same time as or at a different time than the shifting of the transmission 706.

To obtain regenerative braking, the vehicle 700 can either first ensure that the transmission 706 is in second gear (because the first gear may not facilitate regenerative braking), and then use the electric motor 704 for the regenerative braking. Alternatively, the vehicle 700 can use the electric motor 702, where the transmission 716 provides regenerative braking in all (e.g., both) gears, for the regenerative braking regardless of the current gear of the transmission 706 of the electric motor 704.

To drive the vehicle 700 in reverse, the vehicle 700 can either first ensure that the transmission 706 is in first gear (because the second gear may not facilitate driving in reverse), and then operate the electric motor 704 in the opposite direction to drive the vehicle 700 in reverse. Alternatively, the vehicle 700 can use the electric motor 702, where the transmission 716 facilitates driving in reverse in all (e.g., both) gears, to facilitate driving in reverse and not energize the electric motor 704 while in reverse.

The vehicle 700 can have three or more electric motors. For example, two electric motors can power the axle 712, with one or more electric motors powering the axle 714. As another example, two electric motors can power the axle 714, with one or more electric motors powering the axle 712.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A transmission comprising:
   a first planetary stage including a first ring gear defining first internal teeth;
   a ground component defining second internal teeth;
   a compound planetary stage including a one-way clutch with an inner race and an outer race, the outer race having a first tapered surface; and
   an adaptor defining external teeth and a second tapered surface, the adaptor being movable into at least a first position where the first tapered surface and the second tapered surface are connected with each other, and into a second position where instead the first internal teeth are gear coupled with the second internal teeth.

2. The transmission of claim 1, wherein the compound planetary stage has a common shaft with the first planetary stage.

3. The transmission of claim 1, wherein the adaptor is also movable into at least a third position where the first tapered surface and the second tapered surface are not connected with each other, and where the first internal teeth are not gear coupled with the second internal teeth.

4. The transmission of claim 1, wherein the first position corresponds to a first gear ratio for the transmission, and wherein the second position corresponds to a second gear ratio for the transmission.

5. The transmission of claim 4, wherein the first gear ratio is greater than the second gear ratio.

6. The transmission of claim 1, wherein the first planetary stage further comprises:
   a sun gear to be rotated about an axis by a rotor shaft; and
   a first planetary gear that is gear coupled to the sun gear.

7. The transmission of claim 6, wherein the first planetary stage comprises multiple first planetary gears that are gear coupled to the sun gear.

8. The transmission of claim 6, wherein the compound planetary stage further comprises:
   a second planetary gear;
   a second ring gear that is gear coupled to the second planetary gear; and
   a carrier member carrying the first and second planetary gears.

9. The transmission of claim 8, wherein the first planetary gear has a first diameter, wherein the second planetary gear has a second diameter, and wherein the first diameter is greater than the second diameter.

10. The transmission of claim 8, wherein the carrier member is coaxial with the sun gear.

11. The transmission of claim 8, wherein the inner race of the one-way clutch is coupled to the second ring gear.

12. The transmission of claim 8, wherein the compound planetary stage comprises multiple second planetary gears that are gear coupled to the second ring gear.

13. The transmission of claim 8, wherein the second planetary gear has a common shaft with the first planetary gear.

14. The transmission of claim 1, further comprising another one-way clutch coupled between the first ring gear and ground in the transmission.

15. A transmission comprising:
   a first planetary stage including a first ring gear;
   a ground component;
   a compound planetary stage including a second ring gear; and
   means for selectively i) connecting the second ring gear to the ground component, wherein the transmission has a first gear ratio, and ii) instead connecting the first ring gear to the ground component, wherein the transmission has a second gear ratio.

16. A vehicle comprising:
   a first electric motor having a first rotor shaft; and
   a first transmission coupled to the first rotor shaft of the first electric motor, the first transmission comprising:
     a first planetary stage including a first ring gear defining first internal teeth;
     a ground component defining second internal teeth;
     a compound planetary stage including a one-way clutch with an inner race and an outer race, the outer race having a first tapered surface; and
     an adaptor defining external teeth and a second tapered surface, the adaptor being movable into at least a first position where the first tapered surface and the second tapered surface are connected with each other, and into a second position where instead the first internal teeth are gear coupled with the second internal teeth.

17. The vehicle of claim 16, wherein:
   in the first position of the adaptor the first transmission has a first gear ratio, wherein in the first gear ratio the first transmission:
     does not provide regenerative braking; and
     provides a reverse gear mode by reversing a rotation direction of the first rotor shaft; and
   in the second position of the adaptor the first transmission has a second gear ratio, and wherein in the second gear ratio the first transmission:
     does provide the regenerative braking; and
     does not provide the reverse gear mode.

18. The vehicle of claim 17, further comprising:
   a second electric motor having a second rotor shaft; and
   a second transmission coupled to the second rotor shaft of the second electric motor;
   wherein:
     in the first gear ratio of the first transmission the vehicle uses the second transmission for regenerative braking using; and
     in the second gear ratio of the first transmission the vehicle uses the second transmission for the reverse gear mode.

19. The transmission of claim 15, wherein the compound planetary stage has a common shaft with the first planetary stage.

20. The transmission of claim 15, wherein the first planetary stage further comprises:
- a sun gear to be rotated about an axis by a rotor shaft; and
- a first planetary gear that is gear coupled to the sun gear.

* * * * *